United States Patent [19]
Eggert, Jr.

[11] 3,858,934
[45] Jan. 7, 1975

[54] VEHICLE SEAT SAFETY SYSTEM

[75] Inventor: Walter S. Eggert, Jr., Huntington Valley, Pa.

[73] Assignee: The Budd Company, Troy, Mich.

[22] Filed: July 19, 1973

[21] Appl. No.: 380,912

[52] U.S. Cl. .............................. 297/216, 248/429
[51] Int. Cl. ............................................ B60r 21/10
[58] Field of Search ........... 297/216, 346; 248/424, 248/429, 430, 420, 422

[56] References Cited
UNITED STATES PATENTS

| | | | |
|---|---|---|---|
| 2,240,143 | 4/1941 | Lustig | 248/430 |
| 2,665,740 | 1/1954 | Rappl | 248/430 |
| 2,959,207 | 11/1960 | Brewster | 297/216 |
| 3,059,966 | 10/1962 | Spielman | 297/216 |
| 3,184,209 | 5/1965 | Colautti | 248/429 |
| 3,313,512 | 4/1967 | Colautti | 248/424 |
| 3,437,302 | 4/1969 | Homier | 248/422 |
| 3,524,678 | 8/1970 | DeLavenne | 297/216 |
| 3,582,033 | 6/1971 | LaFleche | 248/420 |
| 3,603,638 | 9/1971 | McGregor | 248/429 |

Primary Examiner—Francis K. Zugel

[57] ABSTRACT

Vehicle seat safety system which comprises a yieldable attenuating restraint device, as of the draw type with draw die and elongated drawable element, in which the attenuating device forms a linkage which is pivotally connected to a seat at one end and pivotally connected to a movable seat-positioning slide at the other end, with manual or power means to adjust and hold positions of a seat mounted on retaining tracks.

6 Claims, 7 Drawing Figures

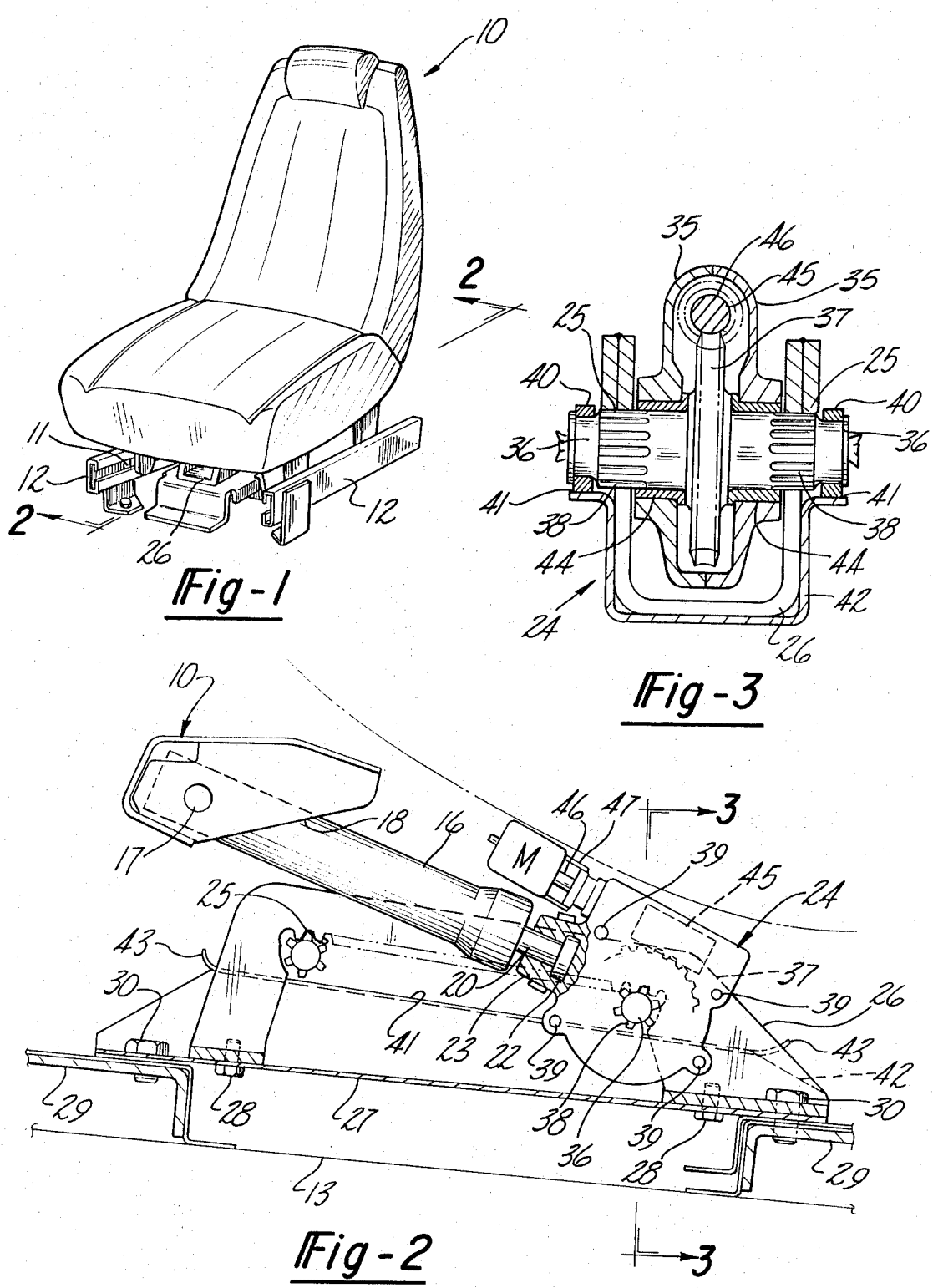

3,858,934

VEHICLE SEAT SAFETY SYSTEM

BACKGROUND

Various forms of yieldable attenuating restraint means have been suggested for allowing a seat to yield upon collision impact to provide a measure of safety for a seat occupant. Some restraint means have included forms in which a draw die reduces the size of a rod. Such attenuating devices of the die and rod draw type, so far as known, have not been built into a seat assembly with an adjustment device in which the seat may be adjusted without varying the degree of attenuation. In any case, die-and-rod attenuating means used heretofore have been non-reversible by usual available manual forces so that the seat occupant could not be readily released by moving the seat back after a crash.

SUMMARY OF INVENTION

The present invention provides an arrangement in which a yieldable attenuating restraint device forms a pivoted connecting link between a seat and a slidable adjusting device, the seat being mounted on retaining tracks, with manual or power means for moving the slide and locking it in any adjusted position. In one form the attenuating means is provided with free back movement after attenuation for quickly releasing a seat occupant after a crash. The invention also provides improved power adjusting means in which a moving pinion is strongly retained with a rack to resist the very great forces of collision tending to shift position. The invention also provides improved details for aiding manufacture and assembly.

DRAWINGS

The objects, advantages and various features of novelty of the invention will be apparent from the following description of specific embodiments of the invention, reference being made to the accompanying drawings, wherein:

FIG. 1 is a vertical longitudinal section and elevation of a seat equipped with a die-and-rod yieldable attenuating restraint means and power adjusting means;

FIG. 2 is an enlarged section and elevation of a portion of the seat and the yieldable attenuating restraint means and power adjusting means;

FIG. 3 is a vertical transverse section taken on the line 3—3 of FIG. 2;

SPECIFIC EMBODIMENTS

As shown in FIG. 1, a seat 10 is provided with rollers 11 mounted in retaining tracks 12 secured in any suitable way to the floor 13 of a vehicle. The seat can be moved forward or backward to accomodate the convenience of an occupant.

Figure 4:
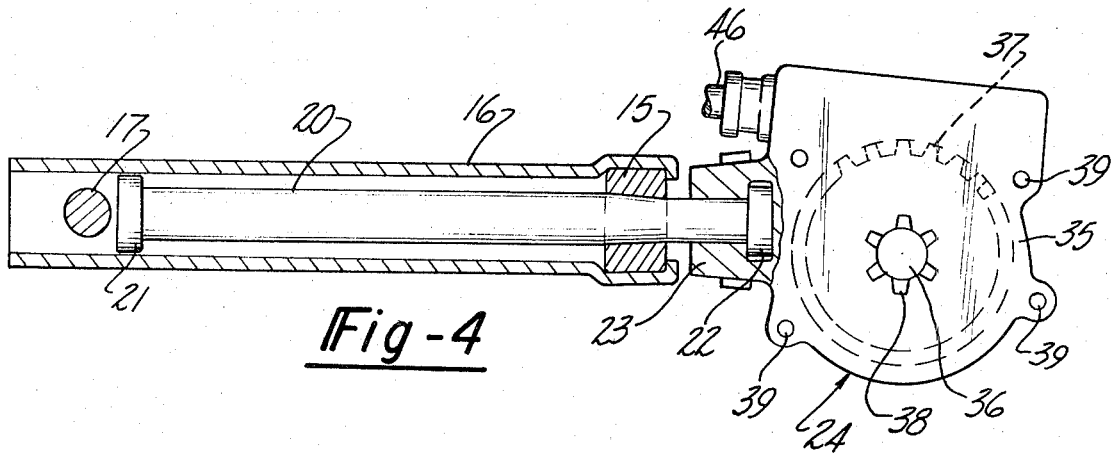
FIG. 4 is a partial vertical longitudinal section through the die-and-rod attenuating device and related parts.

As illustrated in FIGS. 2–4, intermediate its width the seat 10 is provided with an attenuating adjusting unit illustrated as a die-and-rod link arrangement. A draw die 15 is mounted, as by crimping, in one end of a tube or sleeve 16. The forward end of the tube 16 is connected by a pivot pin 17 to a depending bracket 18 of the seat.

A draw rod 20 is disposed within the draw die 15 with the portion to be drawn being disposed within the tube 16. The tube may contain lubricant, if desired, to aid the smoothness of the drawing action in a known manner and prevent corrosion. A head 21 at the front end of the rod 20 limits the extent of the drawing action.

The rear end the rod 20 is provided with a head 22 which is secured in an anchor element 23 of a seat adjusting unit 24.

A power adjusting means illustrating includes a worm-driven hold-fast type. The gear and rack adjusting means comprises a pair of racks 25 carried by a fitting 26 which is secured to a mounting member 27 by bolts 28 or other suitable means. The mounting member 27 is secured to floor support elements 29 by bolts 30. The racks 25 are laminar so as to be easily blanked by stamping operations instead of by requiring, as is usual for gear formation.

The adjusting unit 24 includes a casing 35. A transverse gear shaft 36 is mounted within the casing 35 and includes an intermediate worm gear 37. Pinions 38 mounted outwardly of the gear shaft 36 mesh with the racks 25. The casing 35 illustrated as being made of mating parts adapted to be secured together, as by bolts 39, to retain the shaft 36 and to clamp the head 22 of the draw rod 20.

The pinions 38 are held securely upward against the racks 25 but for free non-binding action by rollers 40 which are disposed on the ends of the gear shaft 36. The rollers 40 bear against guides 41 which are carried by a frame 42 which is secured to the mounting member 27. The guides 41 have raised end elements 43 to limit travel of the slide. The pinions 38 and rollers 40 are small enough to pass through the bearing 44 of the casing parts.

The worm gear 37 is driven by worm pinion 45 carried by a drive shaft 46 which is connected to be turned by a motor M. The motor M may be mounted in any convenient location. Such small service motors often drive through flexible shafting, which arrangement provides for a wide selection of motor mounting positions. As here shown, the motor M is mounted in the casing 35 by brackets 47.

The gear shaft 36 provides a pivot for the rear end of the attenuating link device to serve, along with the pivot pin 17, for accomodating change of angularity upon lengthening of the linking at collision impact.

The draw die 15 is crimped in the sleeve 16 to occupy a fixed position in the sleeve 16. Upon the extremely large forces of collision impact, the rod 20 is drawn through the die 15. Because the portion of the rod 20 passing through the die 15 is not compressed beyond its elastic limit, it will tend to spring back to its original shape. This locks the rod 20 in place and it cannot be pulled back through the die 20 by usual manual power.

Figure 5:
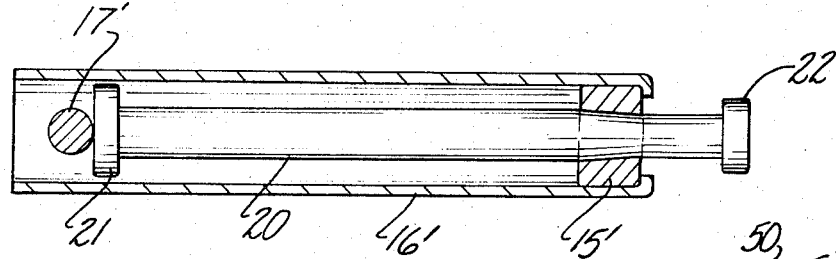
FIG. 5 is a view similar to FIG. 4 but showing a modified die-and-rod device which provides seat pull-back after a collision.

FIG. 5 illustrates a modification which will permit the rod 20 to move through the die 15 and still be moved back after a collision. To provide for ready pull-back, the draw die 15' of FIG. 5 is mounted to be slidable in the tube 16'. Upon collision impact, the turned crimped rear end of the tube and the tube 20' is readily pushed along toward the rear past the draw die 15'. The spring back characteristic will maintain the rod 20' in a locked position with respect to the die 15'. However, the die 15' is still movable within the tube 16'. This arrangement permits moving the seat back to help remove the cooupant.

Figure 7:
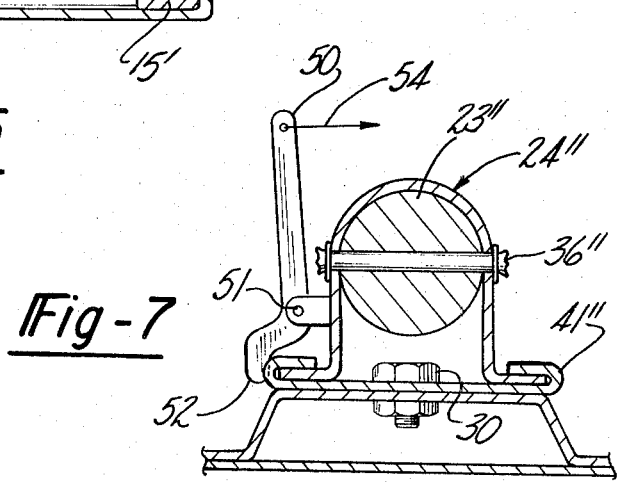
FIG. 7 is a vertical transverse section taken on the line 7—7 of FIG. 6.
Figure 6:
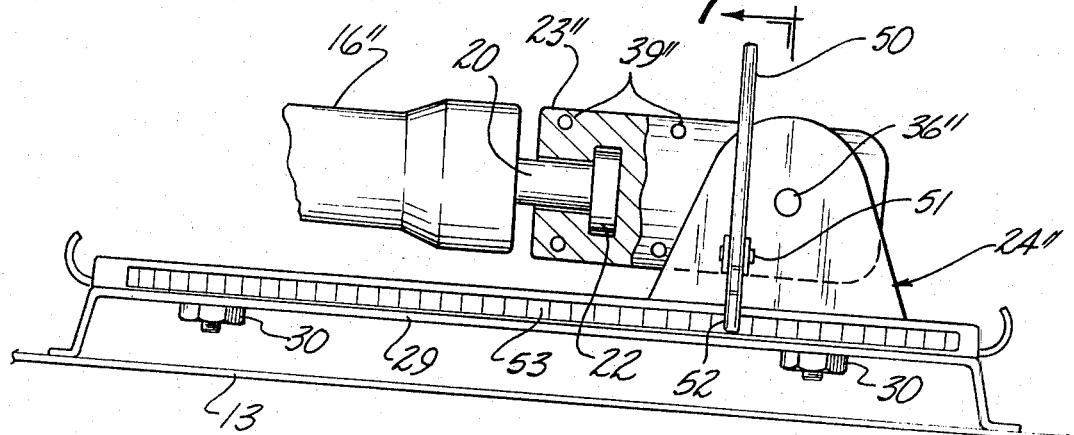
FIG. 6 is a partial vertical longitudinal section showing a manual seat adjusting arrangement.

Referring to FIGS. 6 and 7 there is illustrated a manual seat adjusting means instead of the power adjusting means of the type illustrated in FIGS. 1–4. It is understood, however, that the pull-back arrangement of FIG. 5 may be used with either the power or the manual adjustment arrangement. The tube 16" is connected to the seat by a pivot 17". The draw rod 20" in the draw die 15" is connected at the rear end to a split anchor element 23". The element 23" is connected by means of a pivot pin 36" to a slide 24" which is mounted in a retaining track 41" secured to the floor by bolts 30". The track has raised ends 43" to limit travel.

The seat may be held in a number of different adjusted positions by any convenient latching means. In the embodiment illustrated, a latch 50 is pivoted to brackets on the side of a slide 41" by means of a pin 51. A detent 52 in the pin 51 is adapted to engage one of a plurality of notches 53 in the side of the track slide 41". A spring, not illustrated, may be used to bias the latch 50 into notch-engaging positions. An actuating means 54 which may be a rod or wire, may provide manual accessible operation from the front or side of the seat.

In some case a double latch arrangement may be employed. In this case, a latch and slide arrangement, similar to the latch 50 and slide 41" may be provided. The double lock arrangement locks both sides of the seat to keep locking forces in equilibrium.

It is thus seen that the invention provides a simple and convenient means of mounting an attenuating restraint device and adjusting a seat without disturbing the operating relationship of the attenuating restraint device. The end pivot arrangement accommodates change of angularity upon collision impact. The loose motion arrangement of FIG. 5 provides quick occupant release after collision impact with consequent lengthening of the linkage as the seat moves forward. The laminated rack provides easy gear formation by stamping instead of requiring milling, as is usual for gear formation. The divided casing provides a simple and convenient means for mounting the pinion shaft and securing the rear end of the linkage.

While certain embodiments of the invention have been described for purposes of illustration, it is to be understood that there may be various embodiments and modifications within the general scope of the invention.

What is claimed is:

1. A vehicle seat safety system comprising in combination vehicles floor tracks mounted in spaced horizontal positions to receive and guide rollers therein, a seat mounted for adjusted longitudinal positions and including rollers attached thereto and disposed within said vehicle floor tracks to maintain the seat along a horizontal plane during movements thereof, and a yieldable attenuating restraint device for moving the seat, said restraint device including an attenuating linkage having first and second ends, said first end being pivotally connected to said seat, a slidable adjusting device mounted on a track on the vehicle floor intermediate said spaced tracks and means connecting said slidable adjusting device to said second end of said attenuating linkage, power means for moving said slidable adjusting device, said power means including a pinion shaft, and said intermediate track including a fixed rack on which the pinion of the shaft operates roller means on said pinion shaft, and guide means for said roller means for holding the pinion in engagement with said rack whereby said seat will be maintained in a horizontal plane during the forward movement of said seat resulting from a crash.

2. A vehicle seat safety system as set forth in claim 1, wherein said linkage includes a longitudinal deformable element and a longitudinally movable deforming element, one of said elements having a pivot connection with said seat and the other element having a connection with said adjusting device.

3. A vehicle seat safety system as set forth in claim 2, wherein said deformable element is a longitudinal draw member and said deforming element is a draw die mounted in drawing position on said draw member.

4. A vehicle seat safety system as set forth in claim 3, wherein said elements provide free reverse movement after collision impact has elongated said linkage.

5. A vehicle seat safety system as set forth in claim 1, in which a split casing is provided with bearings for said pinion shaft, the casing bearings being of sufficient size to slide over said pinion and roller means.

6. A vehicle seat safety system as set forth in claim 1, in which said rack is formed of laminated parts adapted to have teeth formed on the laminate elements by separate stamping operations.

* * * * *